July 22, 1924.
L. T. WOOD
VEHICLE BODY DUMPING APPARATUS
Filed May 11, 1921
1,502,534
2 Sheets-Sheet 1
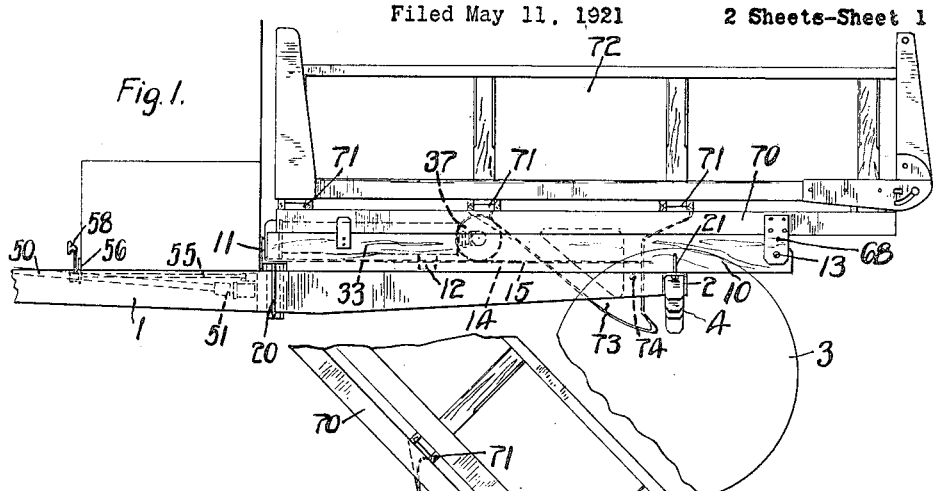
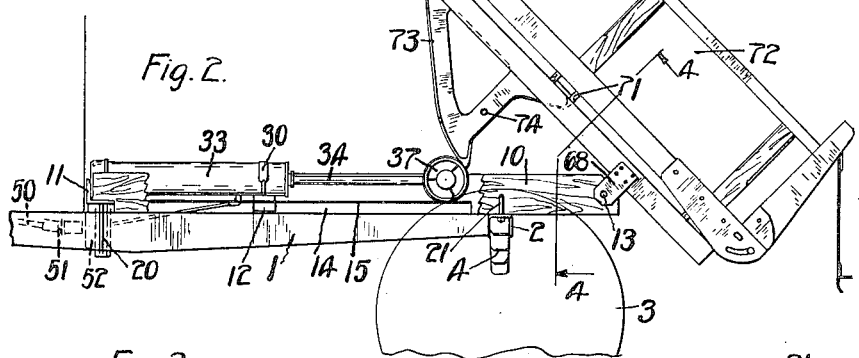
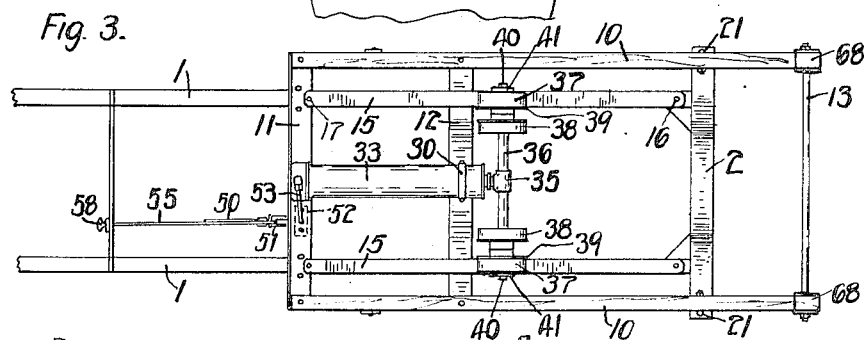
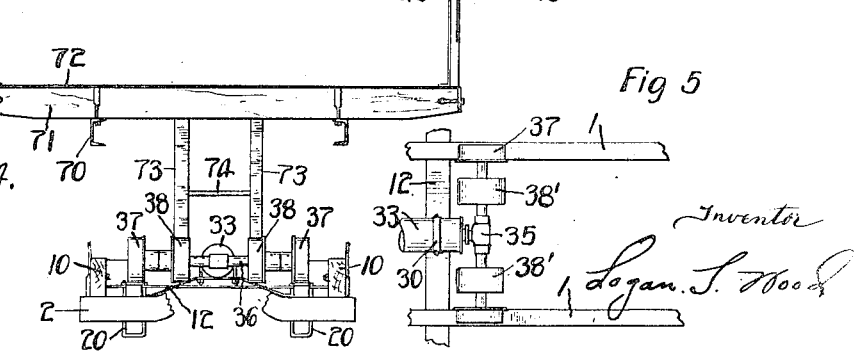
Inventor
Logan T. Wood

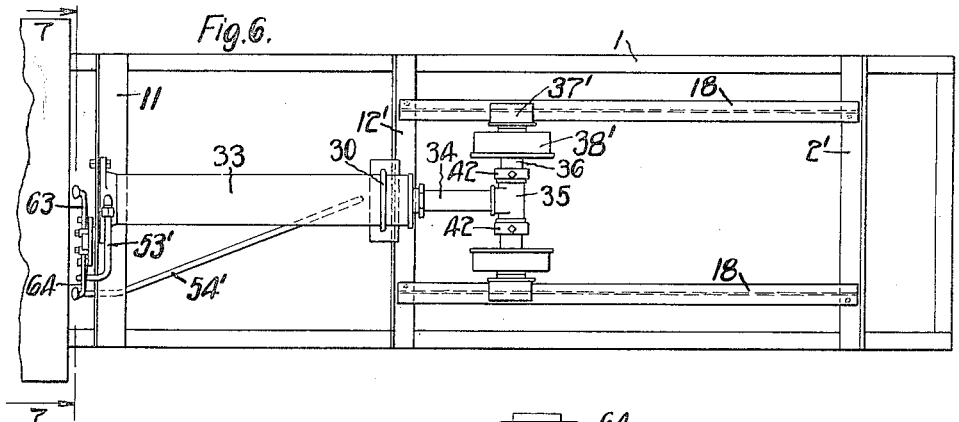
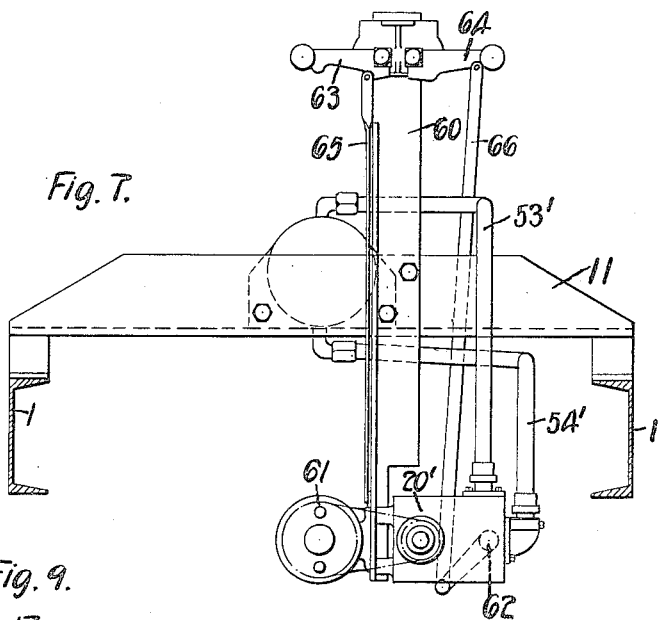
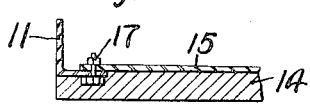
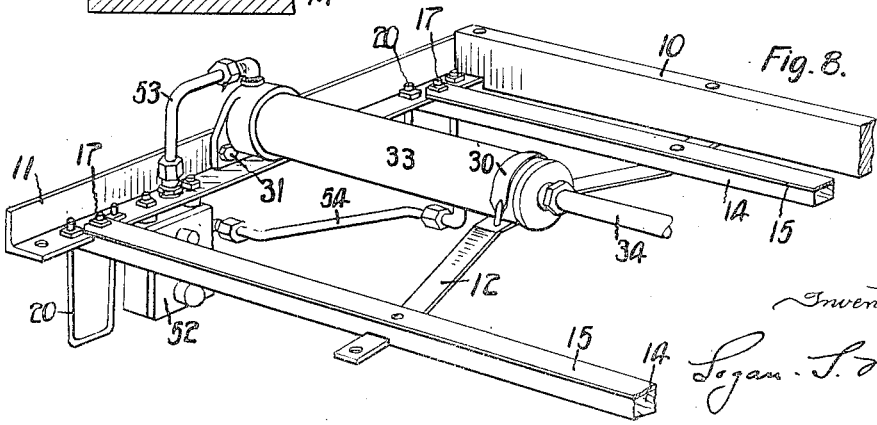

Patented July 22, 1924.

1,502,534

UNITED STATES PATENT OFFICE.

LOGAN T. WOOD, OF MILWAUKEE, WISCONSIN.

VEHICLE-BODY DUMPING APPARATUS.

Application filed May 11, 1921. Serial No. 468,655.

*To all whom it may concern:*

Be it known that I, LOGAN T. WOOD, a citizen of the United States, and a resident of Milwaukee, county of Milwaukee, and State of Wisconsin, have invented certain new and useful Improvements in Vehicle-Body Dumping Apparatus, of which the following is a full, clear, concise, and exact description, such as will enable others skilled in the art to which the invention relates to make and use the same, reference being made therein to the accompanying drawings, which form a part of this specification.

The present invention relates to that class of dumping mechanism for vehicle bodies wherein the body is tiltable about horizontal pivots located near the rear end of the frame; and its primary object is to provide a construction of such nature that the body is largely relieved of twisting stresses, whereby its serviceability is materially improved. An associated object is to provide a construction which may be fabricated and tested as a unit, and which is thereafter capable of application, with little or no change, to the chassis of different makers and of different construction. By proceeding in this manner the outfit may be completed and fully tested prior to being shipped to the particular truck manufacturer or user for which it is intended, thereby deriving the advantages incident to large production, specialized manufacture, and definite relation of parts. The invention also provides an inexpensive construction having few moving parts and in which the use of bodies of maximum length is permitted. Again, the invention provides tilting means of such nature as to permit the body to be mounted substantially directly on the chassis, that is, it permits the location of the center of gravity of the load at a low level, and this without the use of depending parts of such nature as to be likely to encounter obstructions. The invention also provides against falling of the body such as might occur in the event of breakage of a hoisting cable in the ordinary constructions.

In the drawings, Fig. 1 is a side elevation, parts being broken away, showing a preferred embodiment of the invention; Fig. 2 is a similar view showing the body in elevated position; Fig. 3 is a plan view showing the frame and moving parts, the body, wheels, axle and various other parts being omitted; Fig. 4 is a section on line 4—4 of Fig. 2; Fig. 5 is a fragmentary view similar to Fig. 3, showing a modification; Fig. 6 is a view, similar to Fig. 3, showing a further modification; Fig. 7 is a section on line 7—7 of Fig. 6; Fig. 8 is a fragmentary perspective view corresponding to Figs. 1, 2 and 3; and Fig. 9 is a section showing a preferred connection between the track and the forward cross-member shown in Fig. 8.

The vehicle frame proper, shown as an ordinary truck frame, includes the side bars 1 and the rear cross-bar 2 supported from the driving wheels 3 as by means of a transverse spring 4. Other forms of frames and other spring suspensions may of course be used. In accordance with the preferred embodiment of the invention, I provide a super-structure arranged to be clamped or otherwise secured on the frame proper, the actual construction being subject to considerable variation. In Figs. 1, 2, 3, 4, 8 and 9 the super-structure comprises longitudinal beams or side bars 10, which may be of wood, front cross-bar 11, preferably of angle-iron, intermediate cross-bar 12, preferably of flat stock arched upwardly at its middle, rear cross-rod or pivot 13, and parallel tracks which may conveniently be formed from wooden stringers 14 and metal facings 15. The tracks rest directly or indirectly on the upper faces of the side bars 1, the connection to the side bars being preferably made by bolts 16, Fig. 3, passing through holes formed for rivets for the gusset plates whereby the side bars and end cross-bar 2 are ordinarily joined, although other means might of course be used; at the forward end the facings 15—see Fig. 9—are preferably bolted at 17 to the cross-bar 11. In the embodiment which appears in Fig. 5 the side bars 1 are themselves utilized as tracks, this being allowable when the side bars are parallel. In the construction shown in Fig. 6 the tracks 18 are spaced inwardly from the side bars and bolted to cross-members 12' and 2'. The super-structure may be secured to the main frame in any suitable manner, such, for example, as the U-bolts 20 and angle bolts 21, Figs. 1, 2, 3, 4, 8 and 9, or by ordinary bolts (not shown), Fig. 6.

Mounted on the cross-bars 11 and 12, as by means of the clamp 30 and suitable bolts 31, Fig. 8, is a cylinder 33, preferably arranged in the central longitudinal plane of the vehicle, having a piston and a piston rod 34 projecting from the rear end thereof and engaging, through a suitable fitting 35, a cross-head 36 on the outer ends of which are rollers 37 adapted to travel on the tracks 14—15. The rollers may turn on the cross-head or be rigid therewith, in which case the cross-head may turn in the fitting 35. The cross-head may be and preferably is somewhat loose in the fitting 35, which allows the former to depart somewhat from right angle relation to the piston rod, thus compensating for twisting of the truck frame and preventing warping or twisting of the body. Also mounted on the cross-head to turn thereon or to turn therewith, as the case may be, is a second set of rollers 38 preferably spaced somewhat inwardly from the rollers 37; the relative positions of the sets of rollers and the tracks corresponding thereto might be reversed. The rollers 37 are preferably flanged at 39, and the rollers 38 may either be flanged as shown in Fig. 3 or of the plain somewhat wider type indicated at 38' in Fig. 5. In this latter figure the rollers 37 are shown traveling directly on the side bars 1; in other words, the side bars constitute the tracks, as stated heretofore. By providing the rollers 37 and 38 with hubs contacting with each other as indicated in Fig. 3, the former are prevented from spreading apart along the cross-head. They may be of different sizes as shown at 37' and 38' in Fig. 6. The rollers 37 may be retained on the cross-head by screw-bolts 40 tapped into the latter and by washers 41. If desired, collars 42 may be used to keep the parts centered, as shown in Fig. 6. The structure including the cross head and rollers 37 and 38 mounted thereon may be termed a trundle.

Power for thrusting the piston and piston rod rearwardly may be supplied from the engine of the truck, not shown, through the shaft 50, universal joint 51 and a suitable gear pump 52 secured to the cross-bar 11 and having connection to the front end of the cylinder by the pressure pipe 53 and to the rear end thereof by the return pipe 54, as best shown in Fig. 6. A pump suitable for the purpose is shown in United States Patent No. 1,271,968, granted July 9, 1918. The pump valve, whereby the operating fluid, preferably oil, is directed from the reserve (rear) end of the cylinder to the pressure (front) end, or vice versa, may be controlled in various ways, for example, by the shaft 55, the front end of which is carried in a bracket 56 secured to the seat or vehicle structure, and the foot lever or pedal 58. Or the arrangement may be that shown in Figs. 6 and 7, wherein the cross-bar 11 carries an upstanding support 60 on the lower end of which the pump 20' may be mounted and driven in any suitable way such as by means of the mechanism 61. The valve stem 62 and the clutch mechanism 61 may be operated from the upper end portion of the support 60, as by means of the levers 63 and 64 and associated links 65 and 66. The pressure and return pipes appear at 53' and 54'.

Arranged to tilt on brackets 68 (omitted in Fig. 6) which embrace the side bars and through which the cross-rod 13 passes is a body structure formed of the sills 70, cross-beams or bolsters 71 and a suitable floor, box or hopper construction 72; the cross-beams have rigidly attached thereto suitable downwardly and rearwardly inclined tracks 73, which may be of cam-like profile, or of convex or concave contours or combinations of the same, the outline shown being well suited for the purpose. These tracks are preferably formed separately and braced one from the other as indicated at 74, although they might obviously be made in a single casting, and are positioned to ride on the rollers 38 as the latter move rearwardly from the forward limit of their movement. It will be understood that the sills 70 normally rest on the beams 10.

In operation, it being assumed that the shaft 50 or the clutch 61 is temporarily connected to the engine in any suitable manner, the pedal 58 or the lever 64 is shifted in such manner that oil is drawn from the rear end of the cylinder and discharged into the front end thereof under pressure, thereby forcing the piston rod and cross-head rearwardly and causing the rollers 37 and 38 to act as a wedge between the tracks 14—15 and 73, whereupon the body rises about the pivot 13. If desired, the rollers 37 and 38 might be omitted. Preferably the contour of the tracks 73 is such that the body rises relatively slowly during the first part of the travel of the piston in order that the leverage may be made to approximate the load under the different conditions. It will be seen that the construction and arrangement of the cross-head and associated parts is such that the two tracks 73 are positively given equal angular movement about the axis 13 at all times, that is, destructive sagging and warping of the body as it rises and falls is substantially eliminated. The cross-head construction may be regarded as a unit supported over a wide base and movable along the tracks to normally apply substantially only elevating stresses to the body. The arrangement of the cylinder and piston and the general relation of parts is such as to permit the body proper to be mounted but a short distance above the chassis, thereby lowering the center of gravity of the load.

The construction is of course subject to considerable variation otherwise than as heretofore indicated, for example, other means than an hydraulic cylinder might be used to impart power to the cross-head, for example, a screw and nut, a rack and pinion or a drum and cable; however, I regard the construction shown as most desirable.

I claim:

1. Means for tilting a vehicle body about a fixed axis and in respect to a chassis whereby said body is carried, said means comprising spaced relatively inclined sets of tracks carried respectively by the body and by the chassis, each set including a plurality of tracks, and wedge means movable substantially horizontally along between said tracks, and constructed and arranged to cause equal angular movements of the members of the set of tracks carried by the body, whereby warping of the body is avoided.

2. In combination with the frame of a vehicle and a body pivoted thereon to tilt about a fixed horizontal axis, spaced parallel substantially horizontal tracks carried by the frame, a cylinder and a piston therein arranged below the body, the piston being reciprocable substantially horizontally toward and from said axis, a cross-head construction supporting the outer end of said piston and movable along said tracks, and downwardly and rearwardly inclined spaced tracks carried by said body and engaged by said cross-head construction as the latter moves toward said axis to constantly cause substantially equal angular movements of the tracks carried by the body and to tilt said body at first slowly and later at a faster rate for equal linear movements of the piston.

3. In combination with the frame of a vehicle, a super-structure mounted thereon, a body pivoted to tilt on the super-structure, track means on the super-structure, track means fixed to the under side of the body, one of said track means being inclined in respect to the other, a cross-head, mechanism for shifting said cross-head, and rollers moved by said cross-head and associated with said tracks for tilting the body.

4. In combination with vehicle side bars and a body structure supported thereby and pivoted to tilt about a horizontal axis near one end thereof and having its free end resting on said side bars when in lowered position, a pair of spaced tracks one adjacent each side bar and substantially parallel thereto, rollers arranged to travel on said tracks, a cross-head connecting said rollers, other rollers carried by said cross-head between the first named rollers, tracks fixed to said body structure on the lower side thereof adapted to ride on said other rollers, and means for moving said cross-head along the tracks and between the same to cause the body to be elevated by said second rollers.

5. In a device of the character described, a truck frame, a dumping body connected thereto, runners depending from the bottom of said body, a trundle supported by said frame for longitudinal movements with respect thereto, wheels carried by the trundle, power actuated means connected to said trundle for operating the same whereby said wheels serve through the medium of said runners to tilt the body into the dumping position.

6. In a device of the character described, a truck frame, a dumping body connected thereto, runners depending from said body, a trundle supported by said frame, wheels rotatably carried by said trundle, said wheels constituting rollers upon which said runners are movable to effect the tilting of the body in the rearward travel of said trundle, and means to effect the travel of the trundle.

7. In a device of the character described, a truck frame, a dumping body tiltably connected to said frame, runners depending from said body, rail elements secured to said frame, a trundle having a pair of supporting wheels adapted to travel upon the respective rail elements, a second pair of wheels rotatably carried by said trundle intermediate the first named pair of wheels, and means to impart movement to the trundle longitudinally of the frame whereby said second pair of wheels cooperate with said runners to tilt said body into dumping position.

8. In combination with the frame of a vehicle, a body pivoted to tilt thereon, track means on the frame, a horizontally positioned cylinder, a piston rod projecting to the rear therefrom and adapted to be moved outwardly lengthwise, inclined members operatively connected with the body, rollers to traverse the said track means, other rollers to engage the said inclined members, and means connecting the piston rod and rollers for moving the said rollers in the same direction and in equal amount with the movement of the piston rod.

9. In combination with the frame of a truck and a body tiltably mounted thereon to be elevated at its front portion about a rearwardly positioned pivotal axis, a pair of spaced tracks carried by the frame, a cylinder located between said tracks in substantial parallelism therewith, a piston rod projecting to the rear from the cylinder and adapted to be moved lengthwise to the rear, two spaced apart members having under sides inclined relatively to the said tracks operatively connected with the body, rollers to traverse the tracks, other rollers to engage against the inclined under sides of said members, said rollers being rotatable about the same axis, and means connecting the outer end of the piston rod and rollers whereby the rollers move with the piston rod, substantially as and for the purposes described.

In testimony wherof I affix my signature.

LOGAN T. WOOD.